(12) United States Patent
Huang et al.

(10) Patent No.: US 9,883,531 B2
(45) Date of Patent: Jan. 30, 2018

(54) WIRELESS DEVICE, METHOD, AND COMPUTER READABLE MEDIA FOR SIGNALING CLEAR CHANNEL ASSESSMENT PARAMETERS IN A HIGH-EFFICIENCY WIRELESS LOCAL AREA

(71) Applicant: Intel IP Corporation, Santa Clara, CA (US)

(72) Inventors: Po-Kai Huang, West Lafayette, IN (US); Chittabrata Ghosh, Fremont, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 309 days.

(21) Appl. No.: 14/751,092

(22) Filed: Jun. 25, 2015

(65) Prior Publication Data

US 2016/0219461 A1 Jul. 28, 2016

Related U.S. Application Data

(60) Provisional application No. 62/107,218, filed on Jan. 23, 2015.

(51) Int. Cl.
*H04W 74/08* (2009.01)
*H04W 84/12* (2009.01)
*H04W 88/08* (2009.01)

(52) U.S. Cl.
CPC ........ *H04W 74/0808* (2013.01); *H04W 84/12* (2013.01); *H04W 88/08* (2013.01)

(58) Field of Classification Search
CPC .......... H04W 74/002; H04W 74/0808; H04W 74/0816; H04W 74/0825
See application file for complete search history.

(56) References Cited

U.S. PATENT DOCUMENTS

| 2007/0072638 A1* | 3/2007 | Yang | H04W 52/50 455/522 |
| 2014/0198741 A1* | 7/2014 | Barriac | H04W 74/006 370/329 |

(Continued)

*Primary Examiner* — Chi H Pham
*Assistant Examiner* — Weibin Huang
(74) *Attorney, Agent, or Firm* — Schwegman Lundberg & Woessner, P.A.

(57) ABSTRACT

Apparatuses, methods, and computer readable media for signaling clear-channel assessment parameters in a high-efficiency wireless local area network (HEW) are disclosed. A HEW master station comprising circuitry is disclosed. The circuitry may be configured to determine one or more clear-channel assessment (CCA) parameters for one or more HEW stations, and transmit a CCA parameter of the one or more CCA parameters to the corresponding HEW station of the one or more HEW stations. The clear-channel assessment parameter may be one from the following group: mid-packet detect (MPD) threshold, energy detect threshold, and signal detect threshold. The HEW master station may determine the CCA parameter based on the at least one of the following group: an uplink signal strength of the HEW device, a signal quality report received from the HEW device, and a downlink signal strength of the master station received by the HEW device.

24 Claims, 7 Drawing Sheets

(56) References Cited

U.S. PATENT DOCUMENTS

| | | | |
|---|---|---|---|
| 2014/0293905 A1* | 10/2014 | Tian | H04W 72/02 370/329 |
| 2015/0195790 A1* | 7/2015 | Rong | H04W 52/243 370/311 |
| 2015/0201434 A1* | 7/2015 | Fang | H04W 74/0816 370/335 |
| 2015/0264617 A1* | 9/2015 | Choudhury | H04W 36/30 370/332 |
| 2015/0296528 A1* | 10/2015 | Coffey | H04L 1/0021 370/338 |
| 2015/0312941 A1* | 10/2015 | Oh | H04W 74/0816 370/338 |
| 2015/0319700 A1* | 11/2015 | Oteri | H04W 52/28 455/127.1 |
| 2016/0135224 A1* | 5/2016 | Lee | H04L 27/2607 370/338 |

* cited by examiner

US 9,883,531 B2

WIRELESS DEVICE, METHOD, AND COMPUTER READABLE MEDIA FOR SIGNALING CLEAR CHANNEL ASSESSMENT PARAMETERS IN A HIGH-EFFICIENCY WIRELESS LOCAL AREA

PRIORITY CLAIM

This application claims the benefit of priority under 35 USC 119(e) to U.S. Provisional Patent Application Ser. No. 62/107,218, filed Jan. 23, 2015, which is incorporated herein by reference in its entirety.

TECHNICAL FIELD

Embodiments pertain to wireless communications in a wireless local-area network (WLAN) such as Institute of Electrical and Electronic Engineers (IEEE) 802.11. Some embodiments relate to clear-channel assessment (CCA) with mid-packet detect (MPD). Some embodiments relate to updating values for MPD thresholds or other CCA parameters and signaling the updated values for spatial reuse for spatial reuse for device-to-device (D2D) communication.

BACKGROUND

One issue in wireless local area networks (WLANs) is that spatial reuse may increase the resources of the wireless medium. Spatial reuse may be difficult to attain in practice due to the difficulty in distinguishing between different signals.

Thus there are general needs for systems and methods for efficiently using the wireless medium and, in particular, using the wireless medium with spatial reuse.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
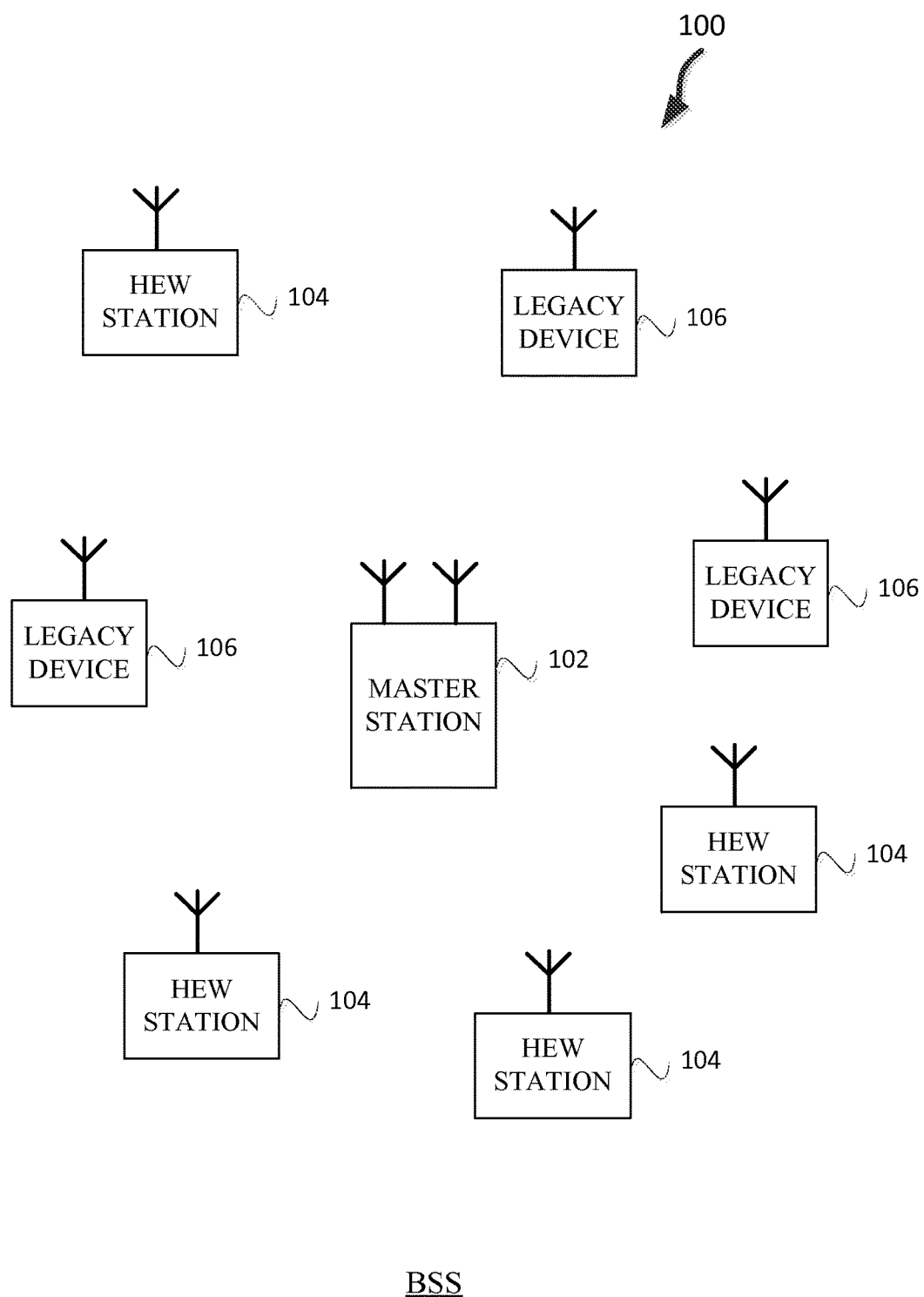
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using OFDMA, time division multiple access (TDMA), and/or code division multiple access (CDMA). The IEEE 802.11 protocol may include a multiple access technique. For example, the IEEE 802.11 protocol may include space-division multiple access (SDMA) and/or MU-MIMO.

The legacy devices 106 may operate in accordance with one or more of IEEE 802.11 a/g/ag/n/ac, IEEE 802.11-2012, or another legacy wireless communication standard. The legacy devices 106 may be STAs or IEEE STAs.

The HEW STAs 104 may be wireless transmit and receive devices such as cellular telephone, handheld wireless device, wireless glasses, wireless watch, wireless personal device, tablet, or another device that may be transmitting and receiving using the IEEE 802.11 protocol such as IEEE 802.11 ax or another wireless protocol. In some embodiments, the HEW STAs 104 may be termed high efficiency (HE) stations.

The BSS 100 may operate on a primary channel and one or more secondary channels or sub-channels. The BSS 100 may include one or more master stations 102. In accordance with some embodiments, the master station 102 may communicate with one or more of the HEW devices 104 on one or more of the secondary channels or sub-channels or the primary channel. In accordance with some embodiments, the master station 102 communicates with the legacy devices 106 on the primary channel. In accordance with some embodiments, the master station 102 may be configured to communicate concurrently with one or more of the HEW STAs 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth as a sub-channel, and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.0 MHz, 2.5 MHz, 5 MHz and 10 MHz, or a combination thereof or another bandwidth that is less or equal to the available bandwidth, may also be used. A HEW frame may be configured for transmitting a number of spatial streams, which may be in accordance with MU-MIMO.

In other embodiments, the master station 102, HEW STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating. In accordance with some embodiments, during the master-sync transmission the HEW STAs 104 may contend for the wireless medium with the legacy devices 106 being excluded from contending for the wireless medium during the master-sync transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the master station 102 and/or HEW stations 104 are configured to perform one or more of the functions and/or methods described herein in conjunction with FIGS. 1-7 such as grouping HEW stations 104 in accordance with CCA parameters, adjusting CCA parameters, and receiving CCA parameters and adjustments to CCA parameters, and operating in accordance with the received or adjusted CCA parameters.

Figure 2:
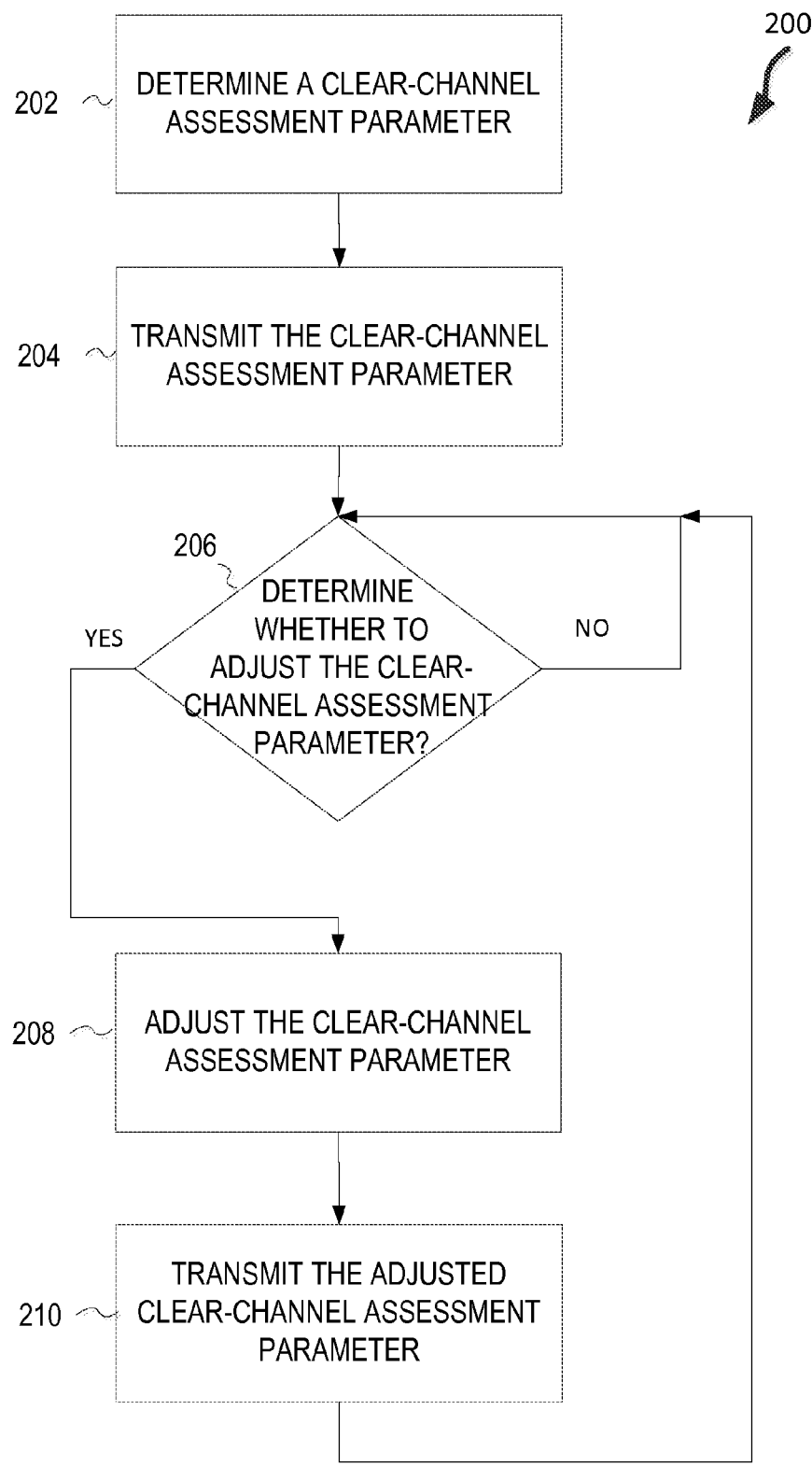
FIG. 2 illustrates a method for signaling a CCA parameter in accordance with some embodiments.

FIG. 2 illustrates a method 200 for signaling a CCA parameter in accordance with some embodiments. The method 200 may begin at operation 202 with determine a clear-channel assessment parameter. For example, the master station 102 may determine a CCA parameter to use. The CCA parameter may be part of a configuration of the master station 102. The CCA parameter may be determined based on the operating characteristics of the master station 102. The CCA parameters may include one or more of the following a MPD threshold, energy detect threshold, and signal detect threshold. In some embodiments, the master station 102 may determine to set the value of the CCA parameter to be the same for some HEW stations 104 and determine a different value for one or more other HEW stations 104.

The HEW stations 104 may have default values for CCA parameters. The HEW stations 104 may use the default values for the CCA parameters before values are signaled by the master station 102. The master station 102 may use a default value for the CCA parameter for its own use or determine a value for itself. The master station 102 may determine a CCA parameter based on the uplink and/or downlink signal strength from the HEW stations 104. For example, HEW stations 104 that are closer to the master station 102 and/or that have stronger signal strength may be able to tolerate greater interference and increased CCA thresholds which may enable more spatial reuse. As another example, HEW stations 104 that are close may be able to use a reduced transmission power that may enable other stations to spatially reuse the wireless medium.

The method 200 may continue at operation 204 with transmit the CCA parameter. For example, the master station 102 may transmit the CCA parameter in a broadcast frame such as a beacon frame. The master station 102 may use a time indication map (TIM) beacon or a delivery TIM (DTIM) beacon. In some embodiments, the master station 102 may transmit the CCA parameter to HEW stations 104 when the HEW stations 104 attach to the master station 102. The master station 102 may use another type of frame to send the CCA parameter.

The method 200 may continue at operation 206 with determine whether to adjust a CCA parameter. For example, the master station 102 may determine whether to adjust one or more of the CCA parameters of the HEW stations 104 and/or the master station 102. The master station 102 may determine whether to adjust CCA parameters based on feedback from the HEW stations 104 and/or based on signals received from the HEW stations 104. The master station 102 and/or HEW stations 104 may determine to adjust one or more CCA parameters so that there is a greater likelihood that spatial reuse may be used. For example, the master station 102 and/or HEW stations 104 may lower transmission power to increase the likelihood that spatial reuse may be used. The CCA parameters may include one or more of: mid-packet detect (MPD) threshold, energy detect threshold, and signal detect threshold.

The method 200 may continue at operation 208 with adjust the CCA parameter. For example, the master station 102 may determine to raise or lower the MDP threshold based on feedback from the HEW stations 104 and/or based on signals received from the HEW stations 104.

The method 200 may continue at operation 210 with transmit the adjusted CCA parameter. For example, the master station 102 may transmit the adjusted CCA parameter to one or more HEW stations 104 in a beacon frame or another frame. The master station 102 may transmit the adjusted CCA parameter to all the HEW stations 104 that are attached to the master station 102 at a same time or at different times. The method 200 may return to operation 206.

Figure 3:
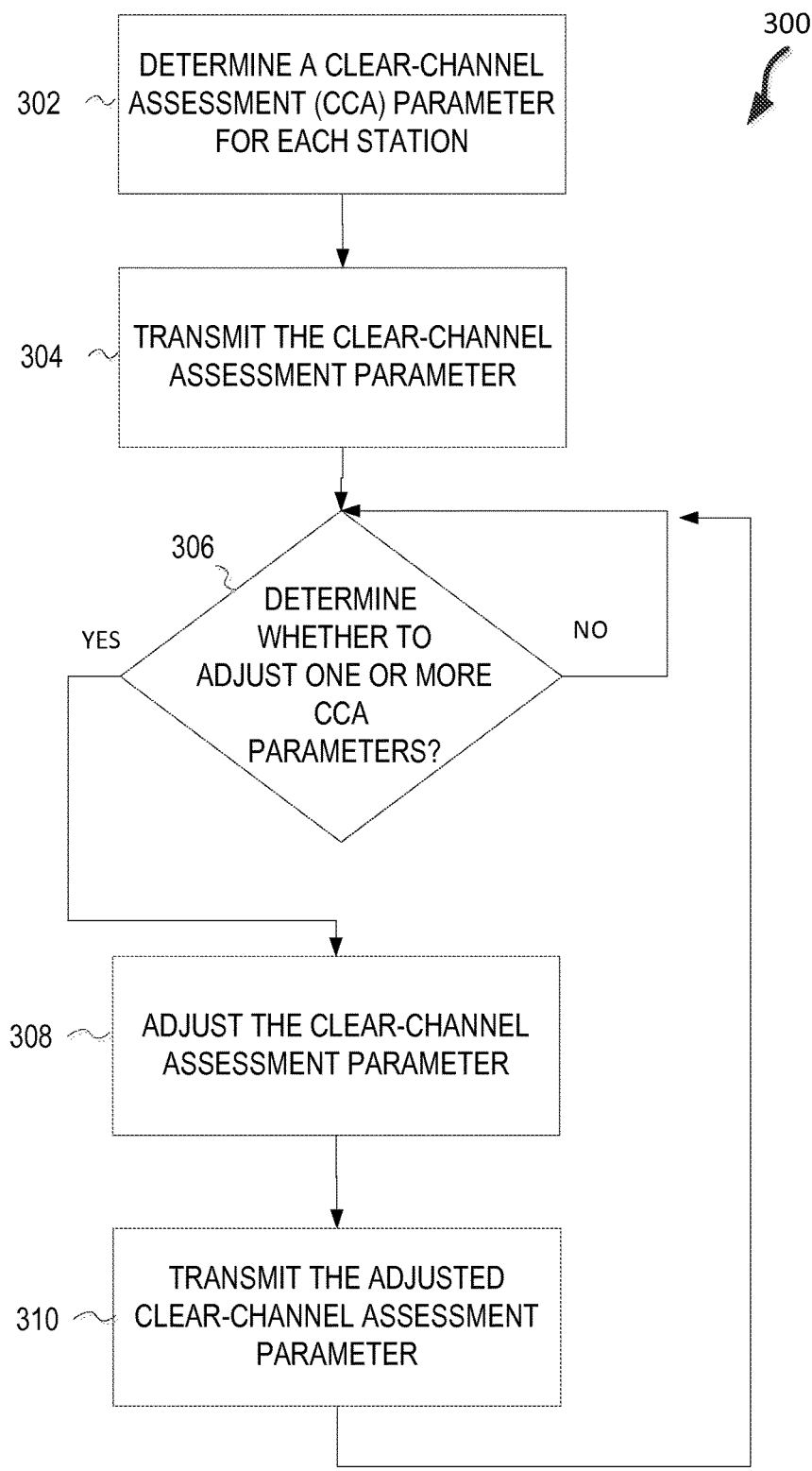
FIG. 3 illustrates a method for signaling a CCA parameter in accordance with some embodiments.

FIG. 3 illustrates a method 300 for signaling a CCA parameter in accordance with some embodiments. The method 300 may begin at operation 302 with determine a clear-channel assessment parameter for each station. For example, the master station 102 may determine a CCA parameter to use for each HEW station 104 that is associated with the master station 102. An initial CCA parameter may be part of a configuration of the master station 102. The CCA parameter may be determined based on the operating characteristics of the master station 102 and/or the HEW station 104.

The CCA parameters may include one or more of the following a mid-packet detect (MPD) threshold, energy detect threshold, and signal detect threshold. The HEW stations 104 may have default values for CCA parameters that the HEW stations 104 may use the default values for the CCA parameters before values are signaled by the master station 102.

The method 300 may continue at operation 304 with transmit the CCA parameter. For example, the master station 102 may transmit the CCA parameter to each of the stations. The master station 102 may use a time indication map (TIM) beacon or a delivery TIM (DTIM) beacon. In some embodiments, the master station 102 may transmit the CCA parameter to HEW stations 104 when the HEW stations 104 attach to the master station 102. The master station 102 may use another type of frame to send the CCA parameter. The master station 102 may transmit a default CCA parameter value for HEW stations 104 to use if the master station 102 does not send a specific CCA parameter value to the HEW station 104. For example, the master station 102 may transmit a default value in a beacon frame and transmit a specific value to a particular HEW station 104. The master station 102 may transmit the CCA parameter to the HEW station 104 in the format of association identification followed by the CCA parameter.

The method 300 may continue at operation 306 with determine whether to adjust one or more CCA parameters. The master station 102 may examine one or more of the CCA parameters that are in use by the HEW station 104. For example, the master station 102 may determine that a particular HEW station 104 should increase the MDP threshold that it is using. In another example, the master station 102 may determine to lower the MDP threshold for several HEW stations 104. The master station 102 may determine to adjust the CCA parameters based on feed-back regarding device-to-device communications. For example, a HEW station 102 may indicate to the master station 102 that it cannot communicate with another HEW station 102. The master station 102 may determine to raise the MDP threshold or another CCA parameter based on the feedback regarding device-to-device communications. In some embodiments the master station 102 may determine whether spatial reuse is in use by HEW stations 104 attached to the master station 102 and adjust the CCA parameters if spatial reuse is not in use. For example, the master station 102 may raise the MPD (operation 308) and transmit the new MPD to the HEW station 104 (operation 310) if spatial reuse is not being used.

The method 300 may continue at operation 308 with adjust the CCA parameter. For example, the master station 102 may determine to raise or lower the MDP threshold or another CCA parameter, and the master station 102 may keep a list of CCA parameters being used by each of the HEW stations 104 as well as a default CCA parameter value. The master station 102 may adjust the CCA parameter to increase the likelihood that spatial reuse may be used. For example, the master station 102 may decrease a transmission powers or increase a threshold.

The method 300 may continue at operation 310 with transmit the adjusted CCA parameter. For example, the master station 102 may transmit the adjusted CCA parameter to one or more HEW stations 104 in a frame to the corresponding HEW station 104. In some embodiments, the master station 102 may transmit an adjusted CCA parameter in a beacon frame. The master station 102 may transmit the adjusted CCA parameter to all the HEW stations 104 that are attached to the master station 102 at different times. For example, the master station 102 may transmit the adjusted CCA parameter to a HEW station 104 when the master station 102 transmits downlink data to the HEW station 104. The method 300 may return to operation 306.

Figure 4:
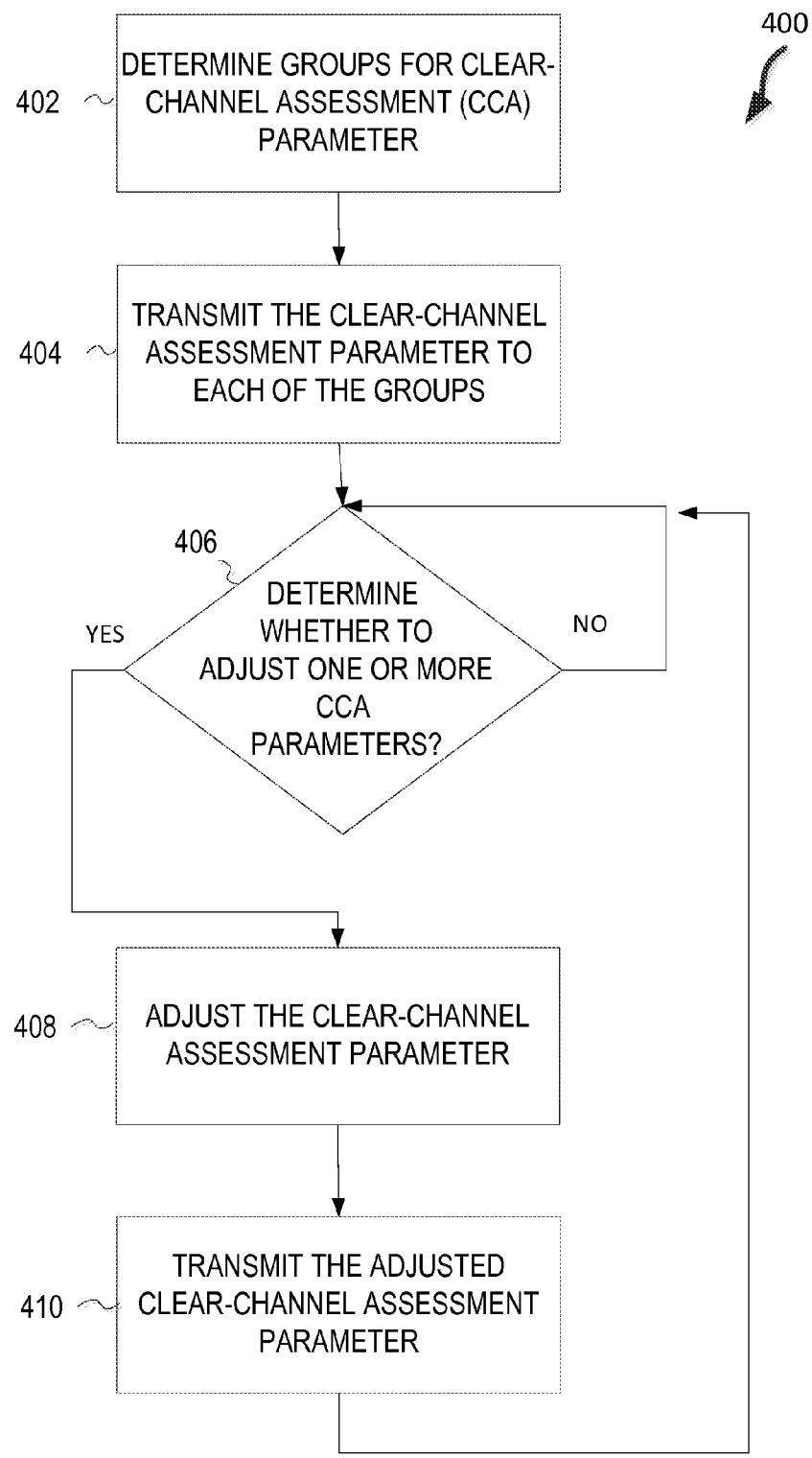
FIG. 4 illustrates a method for signaling a CCA parameter in accordance with some embodiments.

FIG. 4 illustrates a method 400 for signaling a CCA parameter in accordance with some embodiments. The method 400 may begin at operation 402 with determine groups for CCA parameter. For example, the master station 102 may group HEW stations 104 into one or more groups. The master station 102 may not group some HEW stations 104. In some embodiments a group may have only one HEW station 104. The master station 102 may group the HEW stations 104 based on signals received from the HEW stations 104.

The master station 102 may group based on the signal strength of associated HEW stations 104 for UL/DL transmissions. The ability to tolerate interference and achieve spatial reuse may be different for different HEW stations 104. The master station 102 may group HEW stations 104 based on the ability to achieve spatial reuse and assign threshold correspondingly. The overall system performance may be improved in this way. Moreover, by grouping the HEW station 104 the signaling overhead may be reduced.

The method 400 may continue at operation 404 with transmit CCA parameter to each of the groups. For example, the packet 500 described in conjunction with FIG. 5 may be used to transmit parameters to each of the groups. In some embodiments the master station 102 may transmit the CCA parameter to each HEW station 104 individually.

The method 400 may continue at operation 406 with determine whether to adjust one or more CCA parameters. For example, the master station 102 may determine whether or not to adjust a CCA parameter for a group of HEW stations 104 based on signals the master station 102 has received. For example, the signals may be regarding device-to-device communications or related to communication between the HEW stations 104 and the master station 102. In some embodiments, the signals may be regarding the signals that the HEW stations 104 receive from other wireless devices. In some embodiments the master station 102 may determine whether spatial reuse is in use by HEW stations 104 attached to the master station 102 and adjust the CCA parameters if spatial reuse is not in use. For example, the master station 102 may raise the MPD (operation 408) and transmit the new MPD to the HEW station 104 (operation 410) if spatial reuse is not being used. In some embodiments the HEW station 104 may be configured to send a report to the master station 102 regarding whether it is spatially reusing the wireless medium.

The method 400 may continue at operation 408 with adjust the CCA assessment parameter. For example, if it was determined to adjust one or more of the CCA parameters, then the master station 102 may adjust one or more of the CCA parameters in accordance with one or more of the methods described herein.

The method 400 may continue at operation 410 with transmit the adjusted CCA parameter. For example, the master station 102 may transmit the adjusted CCA parameter using the frame 500 in accordance with one or more of the methods described herein.

The method 400 may continue at operation 408 with adjust the CCA parameter. For example, the master station 102 may determine to raise or lower the MDP threshold and the master station 102 may keep a list of CCA parameters being used by each of the HEW stations 104 as well as a default CCA parameter value.

The method 400 may continue at operation 410 with transmit the adjusted CCA parameter. For example, the master station 102 may transmit the adjusted CCA parameter to one or more HEW stations 104 in a frame to the corresponding HEW station 104. In some embodiments, the master station 102 may transmit an adjusted CCA parameter in a beacon frame. The master station 102 may transmit the adjusted CCA parameter to all the HEW stations 104 that are attached to the master station 102 at different times. For example, the master station 102 may transmit the adjusted CCA parameter to a HEW station 104 when the master station 102 transmits downlink data to the HEW station 104. The method 400 may return to operation 406.

Figure 5:
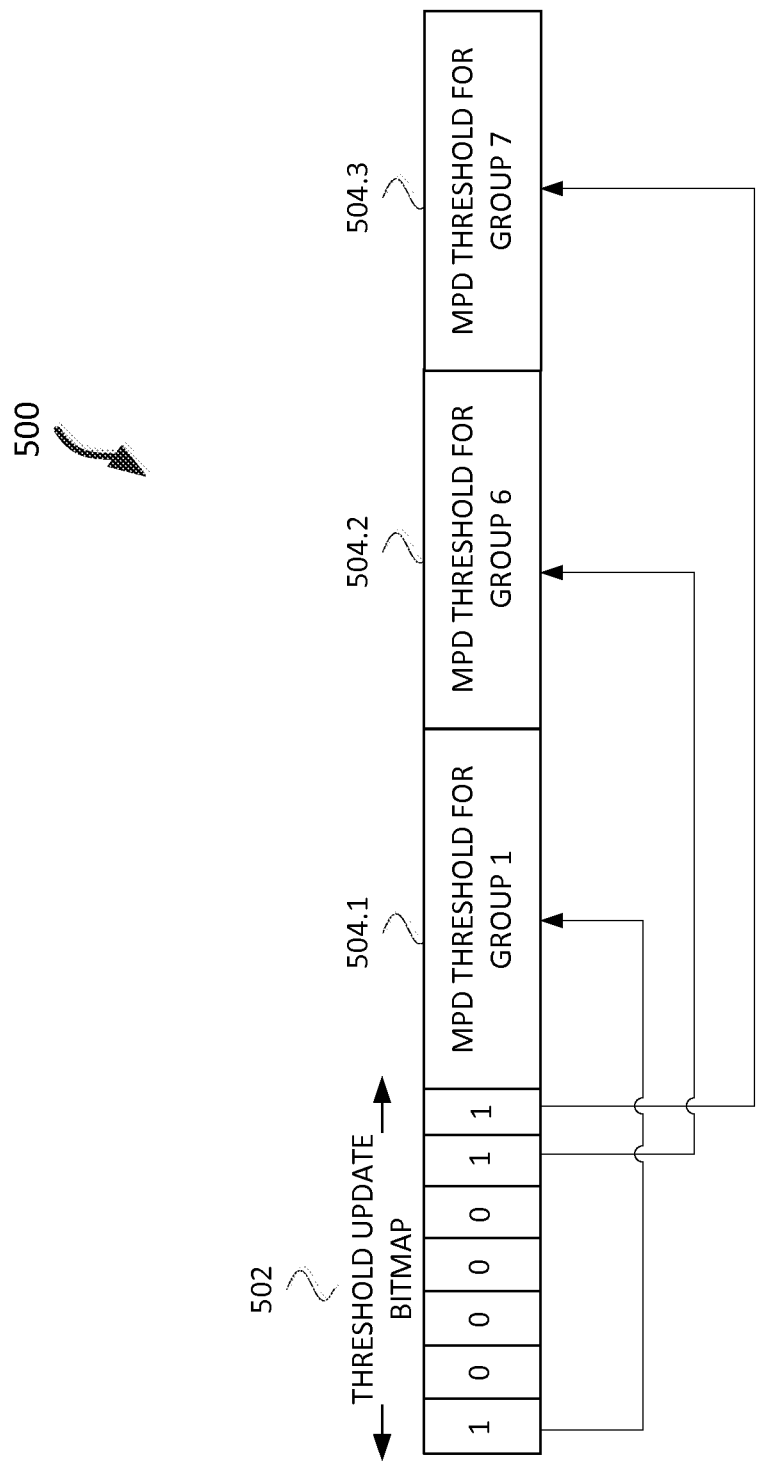
FIG. 5 illustrates an example frame for group signaling in accordance with some embodiments.

FIG. 5 illustrates an example frame 500 for group signaling in accordance with some embodiments. Illustrated in FIG. 5 is a frame 500 that includes a threshold update bitmap 502, a MPD threshold for Group 1 504.1, a MPD threshold for Group 6 504.2, and a MPD threshold for Group 7 504.3. The threshold update bitmap 502 may be a map that indicates which groups are being updated by the frame 500. For example, as illustrated the bits are ordered to indicate which group has an update in the frame 500. The updated CCA parameter may be a MPD threshold. The MPD threshold for a group 504 may be an indication of a new value such as an actual value, or an index into a shared table, or a delta value. Frame 500 may be included in any frame such as a beacon frame.

Figure 6:
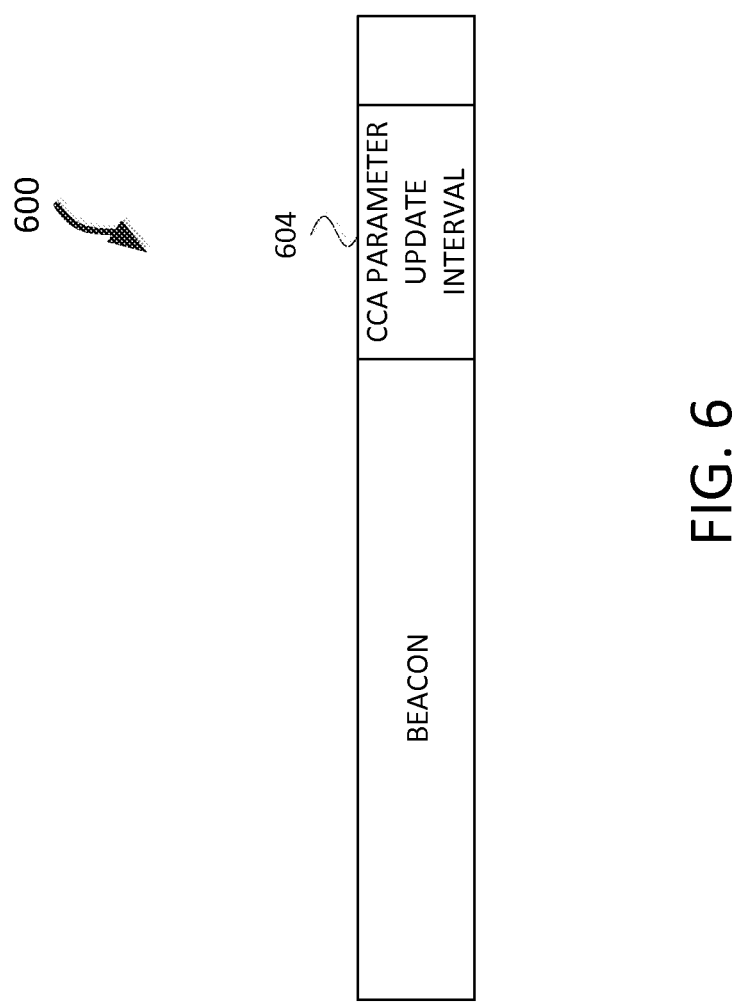
FIG. 6 illustrates a beacon frame in accordance with some embodiments.

FIG. 6 illustrates a beacon frame 600 in accordance with some embodiments. Illustrated in FIG. 6 is a beacon frame 600 that includes a CCA parameter update interval. The CCA parameter update interval 604 may be a time until a next CCA parameter update is transmitted by the master station 102. In some embodiments the CCA parameter update may be a number of beacon frames until the next update of one or more CCA parameters is included in the beacon frame 600.

The CCA parameter update interval 604 may enable a HEW station 104 to enter power save mode until the beacon 600 with the CCA parameter update is transmitted. The CCA parameter update interval 604 may enable HEW stations 104 to improve power savings.

In some embodiments, HEW stations 104 may send an uplink packet like a power save poll (PS-Poll) to inquire of the master station 102 what CCA parameter the HEW station 104 should use or when a next update to the CCA parameter will be transmitted. The master station 102 may respond by piggybacking the information regarding either when the next update will be transmitted or an indication of the actual CCA parameter in an ACK or transmitting another downlink frame to indicate when the next update will be transmitted or an indication of the actual CCA parameter. This may be useful if HEW stations 104 miss signaling from the master station 102 regarding CCA parameters or next update times.

Figure 7:
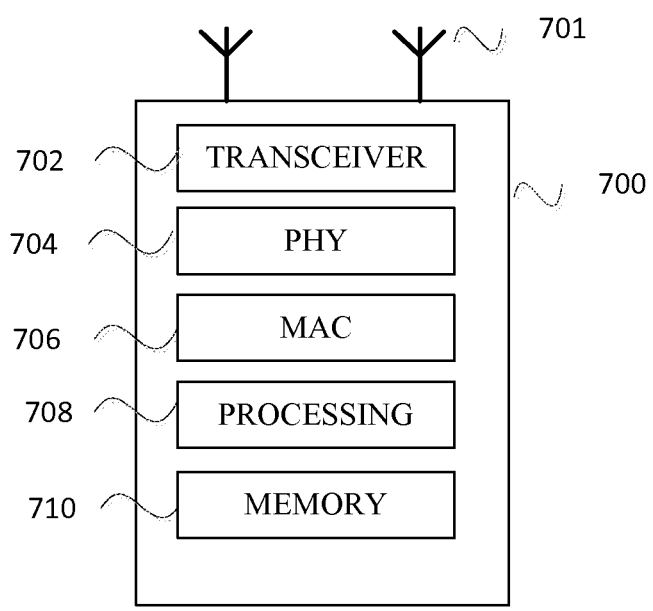
FIG. 7 illustrates a HEW device in accordance with some embodiments.

FIG. 7 illustrates a HEW device in accordance with some embodiments. HEW device 700 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 700 may be suitable for operating as master station 102 (FIG. 1) or a HEW STA 104 (FIG. 1). In accordance with embodiments, HEW device 700 may include, among other things, a transmit/receive element 701 (for example an antenna), a transceiver 702, physical (PHY) circuitry 704, and media access control (MAC) circuitry 706. PHY circuitry 704 and MAC circuitry 706 may be HEW compliant layers and may also be compliant with one or more legacy IEEE 802.11 standards. MAC circuitry 706 may be arranged to configure packets such as a physical layer convergence procedure (PLCP) protocol data unit (PPDUs) and arranged to transmit and receive PPDUs, among other things. HEW device 700 may also include circuitry 708 and memory 710 configured to perform the various operations described herein. The circuitry 708 may be coupled to the transceiver 702, which may be coupled to the transmit/receive element 701. While FIG. 7 depicts the circuitry 708 and the transceiver 702 as separate components, the circuitry 708 and the transceiver 702 may be integrated together in an electronic package or chip.

In some embodiments, the MAC circuitry 706 may be arranged to contend for a wireless medium during a contention period to receive control of the medium for the HEW control period and configure an HEW PPDU. In some embodiments, the MAC circuitry 706 may be arranged to contend for the wireless medium based on channel contention settings, a transmitting power level, and a CCA level.

The PHY circuitry 704 may be arranged to transmit the HEW PPDU. The PHY circuitry 704 may include circuitry for modulation/demodulation, upconversion/downconversion, filtering, amplification, etc. In some embodiments, the circuitry 708 may include one or more processors. The circuitry 708 may be configured to perform functions based on instructions being stored in a RAM or ROM, or based on special purpose circuitry. The circuitry 708 may be termed processing circuitry in accordance with some embodiments. The circuitry 708 may include a processor such as a general purpose processor or special purpose processor. The circuitry 708 may implement one or more functions associated with transmit/receive elements 701, the transceiver 702, the PHY circuitry 704, the MAC circuitry 706, and/or the memory 710.

In some embodiments, the circuitry 708 may be configured to perform one or more of the functions and/or methods described herein and/or in conjunction with FIGS. 1-7 such as grouping HEW stations 104 for CCA parameters, updating CCA parameters, and receiving and operating in accordance with groups and updated CCA parameters.

In some embodiments, the transmit/receive elements 701 may be two or more antennas that may be coupled to the PHY circuitry 704 and arranged for sending and receiving signals including transmission of the HEW packets. The transceiver 702 may transmit and receive data such as HEW PPDU and packets that include an indication that the HEW device 700 should adapt the channel contention settings according to settings included in the packet. The memory 710 may store information for configuring the other circuitry to perform operations for configuring and transmitting HEW packets and performing the various operations to perform one or more of the functions and/or methods described herein and/or in conjunction with FIGS. 1-7 such as grouping HEW stations 104 for CCA parameters, updating CCA parameters, and receiving and operating in accordance with groups and updated CCA parameters.

In some embodiments, the HEW device 700 may be configured to communicate using OFDM communication signals over a multicarrier communication channel. In some embodiments, HEW device 700 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 700 may use 4× symbol duration of 802.11n or 802.11ac.

In some embodiments, an HEW device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 701 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an apparatus of a high-efficiency wireless local-area network (HEW) master station. The apparatus of the HEW master station comprising circuitry configured to: determine one or more clear-channel assessment (CCA) parameters for one or more HEW stations; and transmit a CCA parameter of the one or more CCA parameters to the corresponding HEW station of the one or more HEW stations.

In Example 2, the subject matter of Example 1 can optionally include where the clear-channel assessment parameter is one from the following group: mid-packet detect (MPD) threshold, energy detect threshold, and signal detect threshold.

In Example 3, the subject matter of Examples 1 and 2 can optionally include where the circuitry is configured to transmit the CCA parameter within at least one of the following group: a management frame, a data frame, and a beacon frame.

In Example 4, the subject matter of any of Examples 1-4 can optionally include where the circuitry is further configured to: adjust the CCA parameter of the one or more CCA parameters; and transmit the adjusted CCA parameter to the corresponding HEW station.

In Example 5, the subject matter of Example 4 can optionally include where the circuitry is further configured to adjust the CCA parameter based on at least one of the following group: an uplink signal strength of the HEW device, a signal quality report received from the HEW device, and a downlink signal strength of the master station received by the HEW device.

In Example 6, the subject matter of any of Examples 1-6 can optionally include where the circuitry is further configured to determine the one or more CCA parameters based on at least one of the following group: an uplink signal strength of the HEW device, a signal quality report received from the HEW device, and a downlink signal strength of the master station received by the HEW device.

In Example 7, the subject matter of any of Examples 1-7 can optionally include where the circuitry is further configured to assign each of the one or more HEW stations to one of a plurality of groups of HEW stations; determine the one or more CCA parameters for each of the plurality of groups of HEW stations; and transmit the corresponding CCA parameter of the one or more CCA parameters to the each of the HEW stations of a group of the plurality of groups.

In Example 8, the subject matter of Example 7 can optionally include where the circuitry is further configured to assign each of the one or more HEW stations to one of a plurality of groups of HEW stations based on at least one from the following group: a signal strength to the HEW station, a signal strength from the HEW station, and a signal quality report from the HEW station.

In Example 9, the subject matter of any of Examples 1-8 can optionally include where only one CCA parameter is determined and the only one CCA parameter is to be transmitted to each of the one or more HEW stations.

In Example 10, the subject matter of any of Examples 1-9 can optionally include where the circuitry is configured to transmit a threshold update duration field to indicate a duration until a next adjusted CCA parameter is transmitted.

In Example 11, the subject matter of Example 10 can optionally include where the threshold update duration field is transmitted in a beacon frame, and wherein the threshold update duration field indicates a number of beacon frames before the update duration field is transmitted.

In Example 12, the subject matter of any of Examples 1-11 can optionally include where the circuitry is further configured to receive a request for an updated CCA parameter from a HEW station; and transmit the updated CCA parameter to the HEW station.

In Example 13, the subject matter of any of Examples 1-12 can optionally include where the circuitry is further configured to perform an attachment procedure with each of the one or more HEW stations; and transmit the CCA parameter to each of the one or more HEW stations as part of the attachment procedure.

In Example 14, the subject matter of any of Examples 1-13 can optionally include where the circuitry is further configured to determine the one or more CCA parameters for the one or more HEW stations to improve spatial reuse.

In Example 15, the subject matter of any of Examples 1-14 can optionally include where the one or more CCA parameters is a mid-packet detect (MPD) threshold, and wherein the circuitry is further configured to: determine whether or not spatial reuse is being used by the one or more HEW stations; if spatial reuse is not being used, adjust the MPD threshold to be higher; and transmit the adjusted MPD threshold to the corresponding HEW station.

In Example 16, the subject matter of any of Examples 1-15 can optionally include where the circuitry comprises processing circuitry and transceiver circuitry.

In Example 17, the subject matter of any of Examples 1-16 can optionally include memory coupled to the circuitry; and, one or more antennas coupled to the circuitry.

Example 18 is a method performed by a high-efficiency wireless local-area network (HEW) master station. The method including determining one or more clear-channel assessment (CCA) parameters for one or more HEW stations; and transmitting a CCA parameter of the one or more CCA parameters to the corresponding HEW station of the one or more HEW stations.

In Example 19, the subject matter of Example 18 can optionally include where the clear-channel assessment parameter is one from the following group: mid-packet detect (MPD) threshold, energy detect threshold, and signal detect threshold.

Example 20 is an apparatus of a high-efficiency wireless local-area network (HEW) station. The apparatus of the HEW station including circuitry configured to: receive a clear-channel assessment (CCA) parameter from a HEW master station; operate according to the CCA parameter; transmit a channel quality report to the master station; receive an adjusted CCA parameter; and operate according to the adjusted CCA parameter.

In Example 21, the subject matter of Example 20 can optionally include where the clear-channel assessment parameter is one from the following group: mid-packet detect (MPD) threshold, energy detect threshold, and signal detect threshold.

In Example 22, the subject matter of Example 20 can optionally include where the circuitry is further configured to: receive a group assignment from the master station; receive a packet and determine whether the packet includes the adjusted CCA parameter for the group; and if the packet includes the adjusted CCA parameter, operate according to the adjusted CCA parameter.

In Example 23, the subject matter of any of Examples 20-22 can optionally include memory coupled to the circuitry; and, one or more antennas coupled to the circuitry.

Example 24 is a non-transitory computer-readable storage medium that stores instructions for execution by one or more processors on a wireless communication device. The operations to configure the wireless communication device to: determine one or more clear-channel assessment (CCA) parameters for one or more HEW stations; and transmit a CCA parameter of the one or more CCA parameters to the corresponding HEW station of the one or more HEW stations.

In Example 25, the subject matter of Example 24 can optionally include where the operations to configure the wireless communication device further comprise: adjust the CCA parameter based on the at least one of the following group: an uplink signal strength of the HEW device, a signal quality report received from the HEW device, and a downlink signal strength of the master station received by the HEW device; and transmit the adjusted CCA parameter to the corresponding HEW.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP), the apparatus of the HE AP comprising: memory; and, processing circuitry coupled to the memory, the processing circuitry configured to:
   determine one or more clear-channel assessment (CCA) parameters for one or more HE stations;
   configure the HE AP to transmit a CCA parameter of the one or more CCA parameters to a HE station of the one or more HE stations;
   receive a request for an updated CCA parameter from the HE station;
   determine the updated CCA parameters; and
   in response to the received request, configure the HE AP to transmit the updated CCA parameter to the HE station.

2. The apparatus of the HE AP of claim 1, wherein the (CCA) parameter is one from the following group: mid-packet detect (MPD) threshold, energy detect threshold, and signal detect threshold.

3. The apparatus of the HE AP of claim 1, wherein the processing circuitry is configured to transmit the CCA parameter within at least one of the following group: a management frame, a data frame, and a beacon frame.

4. The apparatus of the HE AP of claim 1, wherein the processing circuitry is further configured to:
   adjust the CCA parameter of the one or more CCA parameters; and
   configure the HE AP to transmit the adjusted CCA parameter to the corresponding HE station.

5. The apparatus of the HE AP of claim 4, wherein the processing circuitry is further configured to adjust the CCA parameter based on at least one of the following group: an uplink signal strength of one or more of the one or more HE stations, a signal quality report received from one or more of the one or more HE stations, and a downlink signal strength of the HE AP received by one or more of the one or more HE stations.

6. The apparatus of the HE AP of claim 1, wherein the processing circuitry is further configured to determine the one or more CCA parameters based on at least one of the following group: an uplink signal strength of one or more the one or more H stations, a signal quality report received from one or more of the one or more HE stations, and a downlink signal strength of the HE AP received by the HE device.

7. The apparatus of the HE AP of claim 1, wherein the processing circuitry is further configured to assign each of the one or more HE stations to one of a plurality of groups of HE stations;
   determine the one or more CCA parameters for each of the plurality of groups of HE stations; and
   configure the HE AP to transmit a corresponding one or more CCA parameters to each of the HE stations of each group of the plurality of groups.

8. The apparatus of the HE AP of claim 7, wherein the processing circuitry is further configured to assign a HE station to one of a plurality of groups of HE stations based on at least one from the following group: a signal strength from the HE AP to the HE station, a signal strength from the HE station, and a signal quality report from the HE station.

9. The apparatus of the HE AP of claim 1, wherein only one CCA parameter is determined and the only one CCA parameter is to be transmitted to each of the one or more HE stations.

10. The apparatus of the HE AP of claim 1, wherein the processing circuitry is configured to transmit a threshold update duration field to indicate a duration until a next adjusted CCA parameter is transmitted.

11. The apparatus of the HE AP of claim 10, wherein the threshold update duration field is transmitted in a beacon frame, and wherein the threshold update duration field indicates a number of beacon frames before the update duration field is transmitted.

12. The apparatus of the HE AP of claim 1, wherein the processing circuitry is further configured to perform an attachment procedure with each of the one or more HE stations; and transmit the CCA parameter to each of the one or more HE stations as part of the attachment procedure.

13. The apparatus of the HE AP of claim 1, wherein the processing circuitry is further configured to determine the one or more CCA parameters for the one or more HE stations to improve spatial reuse.

14. The apparatus of the HE AP of claim 1, wherein the one or more CCA parameters is a mid-packet detect (MPD) threshold, and wherein the circuitry is further configured to:
 determine whether or not spatial reuse is being used by the one or more HE stations;
 if spatial reuse is not being used, adjust the MPD threshold to be higher; and
 transmit the adjusted MPD threshold to the one or more HE stations.

15. The apparatus of the HE AP of claim 1, wherein the circuitry comprises processing circuitry and transceiver circuitry.

16. The apparatus of the HE AP of claim 1, further comprising memory coupled to the circuitry; and, one or more antennas coupled to the circuitry.

17. A method performed by a high-efficiency (HE) access point (AP), the method comprising:
 determining one or more clear-channel assessment (CCA) parameters for one or more HE stations; and
 transmitting a CCA parameter of the one or more CCA parameters to a corresponding HE station of the one or more HEW stations; and
 receiving a request for an updated CCA parameter from the HE station;
 determining the updated CCA parameter; and
 transmitting the updated CCA parameter to the HE station.

18. The method of claim 17, wherein the clear-channel assessment parameter is one from the following group: mid-packet detect (MPD) threshold, energy detect threshold, and signal detect threshold.

19. An apparatus of a high-efficiency (HE) station, the apparatus of the HE station comprising circuitry configured to:
 receive a clear-channel assessment (CCA) parameter from a HE access point;
 operate according to the CCA parameter;
 transmit a channel quality report to the HE access point;
 receive an adjusted CCA parameter;
 operate according to the adjusted CCA parameter;
 configure the HE station to transmit a request for an update of the adjusted CCA parameter;
 receive an updated adjusted CCA parameter; and
 operate according to the updated adjusted CCA parameter.

20. The apparatus of the HE station of claim 19, wherein the clear-channel assessment parameter is one from the following group: mid-packet detect (MPD) threshold, energy detect threshold, and signal detect threshold.

21. The apparatus of the HE station of claim 19, wherein the circuitry is further configured to:
 receive a group assignment from the HE AP;
 receive a packet and determine whether the packet includes the adjusted CCA parameter for the group; and
 if the packet includes the adjusted CCA parameter, operate according to the adjusted CCA parameter.

22. The apparatus of the HE station of claim 19, further comprising memory coupled to the circuitry; and, one or more antennas coupled to the circuitry.

23. A non-transitory computer-readable storage medium that stores instructions for execution by one or more processors on a wireless communication device, the operations to configure the wireless communication device to:
 determine one or more clear-channel assessment (CCA) parameters for one or more high-efficiency (HE) stations;
 transmit a CCA parameter of the one or more CCA parameters to a corresponding HE station of the one or more HE stations;
 receive a request for an updated CCA parameter from a HE station;
 determine the updated CCA parameter; and
 in response to the received request, transmit the updated CCA parameter to the HE station.

24. The non-transitory computer-readable storage medium of claim 23, wherein the operations to configure the wireless communication device further comprise:
 adjust the CCA parameter based on the at least one of the following group: an uplink signal strength of one or more of the one or HE stations, a signal quality report received from one or more of the one or more HE stations, and a downlink signal strength of the wireless communication device received by one or more of the one or more HE stations; and
 transmit the adjusted CCA parameter to the corresponding HE station.

* * * * *